US006557780B1

United States Patent
Mora

(10) Patent No.: US 6,557,780 B1
(45) Date of Patent: May 6, 2003

(54) IRRIGATION PIPE PROTECTOR

(76) Inventor: Manford L. Mora, 5915 Andromeda Ave., NW, Albuquerque, NM (US) 87114

( * ) Notice: Subject to any disclaimer, the term of this patent is extended or adjusted under 35 U.S.C. 154(b) by 0 days.

(21) Appl. No.: 10/200,655

(22) Filed: Jul. 22, 2002

(51) Int. Cl.[7] .............................................. B29D 23/22
(52) U.S. Cl. ....................... 239/201; 239/288; 138/110; 138/118.1; 138/149; 138/105
(58) Field of Search .............................. 138/110, 118.1, 138/149, 105; 239/201, 288

(56) References Cited

U.S. PATENT DOCUMENTS

| | | |
|---|---|---|
| 3,703,992 A | 11/1972 | Merryweather |
| 3,714,750 A | 2/1973 | Pallotto |
| 3,741,252 A | 6/1973 | Williams |
| 3,759,445 A | 9/1973 | King |
| 3,819,137 A | 6/1974 | Smith |
| 3,856,208 A | 12/1974 | Naftaly |
| 3,904,120 A | 9/1975 | Sbicca |
| 3,929,288 A | 12/1975 | Brusadin et al. |
| 4,095,744 A | 6/1978 | Villelli |
| 4,228,978 A | 10/1980 | Rand |
| 4,350,296 A | 9/1982 | Kuhlman et al. |
| 4,403,758 A | 9/1983 | Burt |
| 4,413,656 A * | 11/1983 | Pithouse ..................... 138/110 |
| 4,582,256 A | 4/1986 | Jaquez |
| 4,715,570 A | 12/1987 | Mashuda |
| 4,857,371 A * | 8/1989 | McClintock ................ 428/36.5 |
| 4,930,543 A * | 6/1990 | Zuiches ....................... 138/110 |
| 5,039,011 A | 8/1991 | Parker |
| 5,067,679 A | 11/1991 | Courtney |
| 5,303,744 A | 4/1994 | Eriksson |
| 5,458,290 A | 10/1995 | Johnson |
| 5,465,759 A | 11/1995 | Carlson et al. |
| 5,938,983 A * | 8/1999 | Sheaffer et al. ........... 261/122.1 |
| 5,988,227 A * | 11/1999 | Magoffin ..................... 138/110 |

* cited by examiner

*Primary Examiner*—Gregory L. Huson
*Assistant Examiner*—Azadeh Kokabi
(74) *Attorney, Agent, or Firm*—Dennis F. Armijo

(57) ABSTRACT

A padding is placed around an underground irrigation pipe which allows the irrigation pipe to flex and bend when the irrigation pipe is struck or compressed. The padding is preferably a synthetic polymer that substantially reverts back to its original size after the compressing force is removed and is not affected by the elements. The padding is used over the irrigation pipe in areas of heavy traffic over the pipe or areas where the pipe may be struck. The pipe can be inserted into apertures in the padding or slits can be made in the padding to allow insertion of the pipe into the apertures. These channels can be prefabricated or cut into the padding as needed.

18 Claims, 4 Drawing Sheets

IRRIGATION PIPE PROTECTOR

BACKGROUND OF THE INVENTION

1. Field of the Invention (Technical Field)

The invention relates to an apparatus and method for protecting irrigation pipes and more particularly an apparatus and method for surrounding irrigation pipes with a supporting material that allows the irrigation pipe to flex and bend.

2. Background Art

Irrigation systems, such as sprinkler and drip systems, usually require rigid or semi-rigid plastic pipe for delivery of water to the sprinkler or drip head. The pipe is usually buried in the ground, typically at a shallow level depending on the ground freeze temperature at the location. The pipes are usually laid into a trench with risers to the surface, attached to the pipe, and covered with soil. The soil is then packed and sprinkler or drip nozzles attached to the risers. This type of system is adequate if the pipes are undisturbed. However, due to the compaction of the soil adjoining the pipes there is no room for the pipes to flex or bend when a heavy object, such as a vehicle or even a person, passes over the pipes. This causes the pipes to break, making the system unuseable.

An attempt to solve this problem was to use swivel joints and flex hoses to keep them from breaking when a downward force or impact is exerted near or above them. The problem with this attempted solution is that the ground around the swivel joints and flex hoses is compacted, thus leaving little or no room for movement of these items.

U.S. Pat. No. 5,465,759 to Carlson, et al., teaches the use of rubber pipe protectors for use in down hole drilling. These protectors are used to serve as bumpers to protect the pipe when it is inserted into a metal casing. This pipe protector has one or more flaps to accommodate different sized pipes and is firmly attached to the pipe to keep it secure.

U.S. Pat. No. 3,741,252 to Williams is another drill pipe protector that is specifically designed for use in corrosive fluid environments.

U.S. Pat. No. 5,303,744 to Eriksson discloses an assembly of pipe protectors for use with hot pipes such as steam pipes that are installed on walls in factories. These sleeves are used to protect personnel from accidentally touching the hot pipes and for ease of cleaning the pipes.

U.S Pat. No. 3,714,750 to Pallotto describes a metal covering with attaching clips for covering risers that are aesthetically pleasing and also to protect persons from directly contacting the riser.

U.S. Pat. No. 4,095,744 to Villelli teaches the use of a fork shaped element attached to a sprinkler system riser to restrain the riser and keep it from being damaged due to accidental or vandal induced breakage. The fork shaped element supports the riser thus keeping the riser in a vertical orientation.

U.S. Pat. No. 3,856,208 to Naftaly discloses a supporting structure for sprinkler risers for a system removably affixed above ground.

U.S. Pat. No. 5,039,011 to Parker discloses a flexible hose covered with a similarly pleated flexible vinyl jacket for use as risers for sprinkler systems.

U.S. Pat. No. 3,703,992 to Merryweather describes disc shaped members that are stacked around sprinkler risers for protection and U.S. Pat. No. 3,759,445 to King describes a flexible riser portion to allow movement of the riser when struck.

U.S. Pat. No. 3,904,120 to Sbicca describes another disc shaped member affixed around a riser for protection while U.S. Pat. No. 4,350,296 to Kuhlman, et al., describes a protective hard sleeve that surrounds a sprinkler head or emitter U.S. Pat. No. 4,582,256 to Jaquez and U.S. Pat. No. 5,458,290 to Johnson both describe sprinkler head supports to protect sprinkler heads from damage.

However, none of the prior art teaches the use of a supporting material placed around a water carrying pipe for allowing the pipe to flex or bend when struck or compacted.

SUMMARY OF THE INVENTION
(DISCLOSURE OF THE INVENTION)

In accordance with the present invention there is provided a method and apparatus for protecting buried pipes from cracking or breaking due to forces exerted onto the pipes. The preferred sprinkler system for protecting sprinkler pipes from breaking due to forces exerted onto the sprinkler pipes comprises a padding material disposed around the sprinkler pipes, the padding material comprising a material that reverts to approximately a same size after the force is removed. The preferred padding material comprises a material that allows limited movement of the sprinkler pipe when the forces are exerted onto the sprinkler pipe. The preferred padding material comprises polyethylene. The preferred polyethylene comprises a foam material. The preferred foam material comprises styrofoam. The preferred padding material comprises approximately two and one-half pounds crush weight. The preferred padding material also comprises a width and height to allow a predetermined amount of movement by the sprinkler pipe when the forces are exerted onto the sprinkler pipe. The preferred padding material comprises a non-deteriorating material. The preferred material comprises ethylene vinyl acetate.

The preferred method for protecting buried pipes from breaking due to forces exerted onto the pipes comprises the steps of disposing a padding material around the pipes, the padding material comprising a material that reverts to approximately a same size after the force is removed and burying the padded pipes. The preferred step of disposing comprises making an aperture in the padding material and inserting the pipe into the aperture. The method further comprises making a slit in the padding material into the aperture and parallel to the aperture. The step of disposing also comprises molding the padding material around the pipe in an uncured state and curing the padding material. The step of disposing can also comprise spraying the padding material onto the pipe in an uncured state and curing the padding material. The step of disposing comprises encasing the pipe with the padding material in a manner that allows limited movement of the pipe when forces are exerted onto the pipe. The preferred method further comprises the step of selecting a padding material with a preselected crush weight. The preferred padding material comprises polyethylene. The preferred polyethylene comprises a foam material. The preferred foam material comprises siyrofoam. The step of selecting comprises selecting a padding material comprising a width and height to allow a predetermined amount of movement by the pipe when the forces are exerted onto the pipe. The step of selecting further comprises selecting a padding material comprising a non-deteriorating material.

A primary object of the present invention is to provide protection from breakage to buried sprinkler irrigation components.

Another object of the present invention is to provide limited movement to buried sprinkler components to keep the components from breaking.

Yet another object of the present invention is to provide protection to buried sprinkler irrigation components when driven over by heavy vehicles.

Another object of the present invention is to provide protection to individuals or sports participants from injury when they come in contact with sprinkler heads or other sprinkler components.

A primary advantage of the present invention is that it is simple to install.

Another advantage of the present invention is that it is inexpensive.

Yet another advantage on the present invention is that once installed, it requires little or no maintenance.

Another advantage of the present invention is that it provides anti-vandalism protection to sprinkler components.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

(BEST MODES FOR CARRYING OUT THE INVENTION)

The present invention is for padding that is placed around sprinkler components such as swivel joints and/or flex hose in irrigation systems to allow the swivel joints and/or flex hoses to move with an impact or compression, thus keeping the swivel joints and/or flex hoses from breaking. The irrigation padding is preferably a polymer synthetic.

Figure 1:
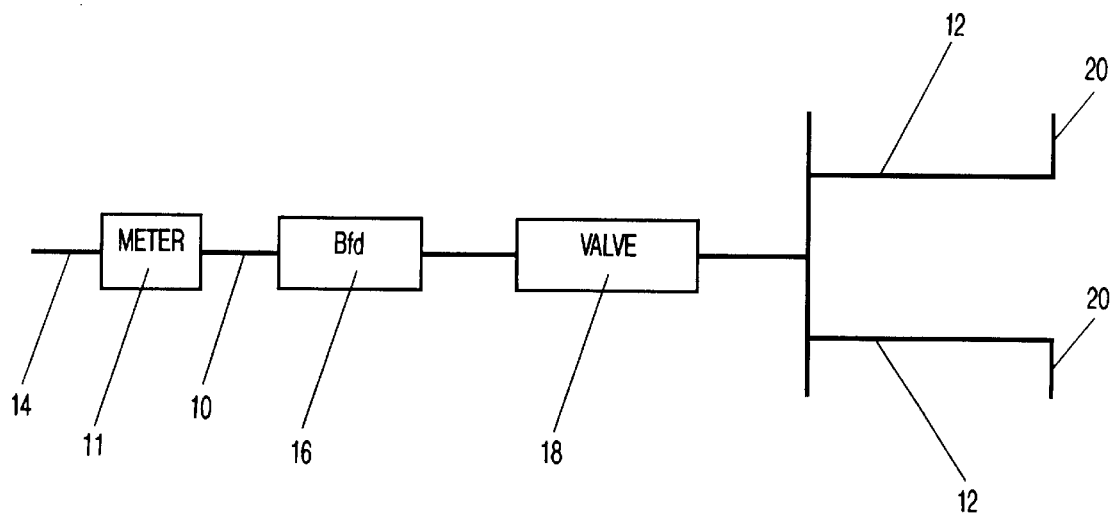
FIG. 1 schematically shows a typical sprinkler system installation.

Prior to discussing the invention and how it is used, a brief discussion of a typical irrigation installation will be discussed. Prior to installing the irrigation padding, one must plan the irrigation system. As shown in FIG. 1, a trench must be dug to the main line connection 10, from meter 11 to the lateral lines 12. This is usually done with a tractor or hand held trencher. The depth must be below the freeze line in that particular region. After trenching, construction can begin on the main line 10. From the main water source 14, a male adapter threaded male to slip female coupling is tied in (not shown). Normally Polyvinyl Chloride (PVC) pipe is used for irrigation systems. To attach the PVC together, you can use a PVC primer and a PVC cement. The fittings simply slide in together. Main line 10 is then installed to slip female coupling. Normally a back flow prevention device 16 is installed onto the main line 10. Thereafter, one or more valves 18 are installed which control the release of the water. After the valves 18 are installed, lateral lines 12 are tied in. From the lateral lines 12, either swivel joints or flex assemblies 20 are attached and positioned.

Figure 2A:
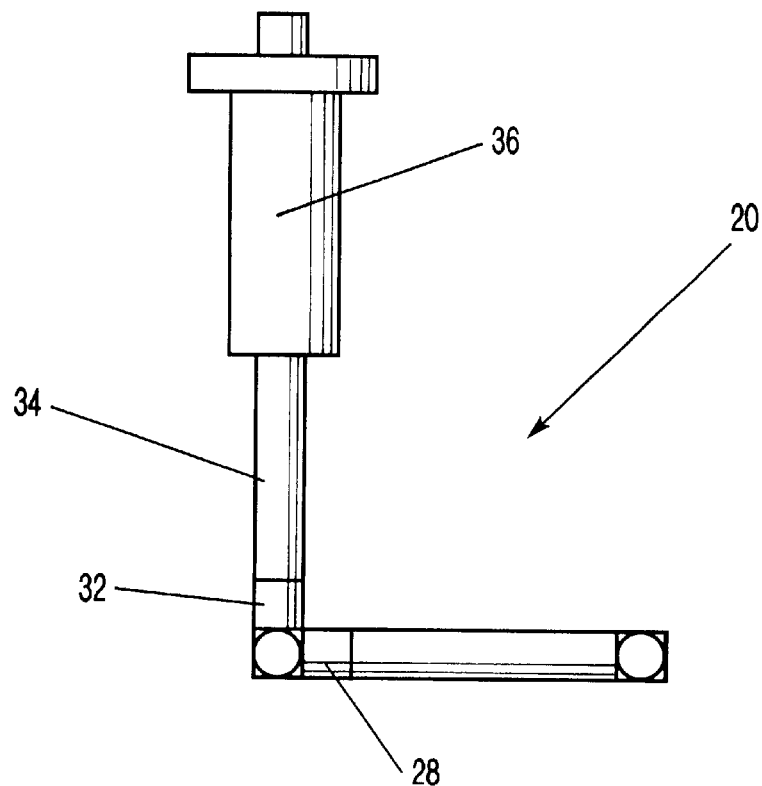
FIG. 2A is a side view of a typical swivel joint or flex assembly.
Figure 2B:
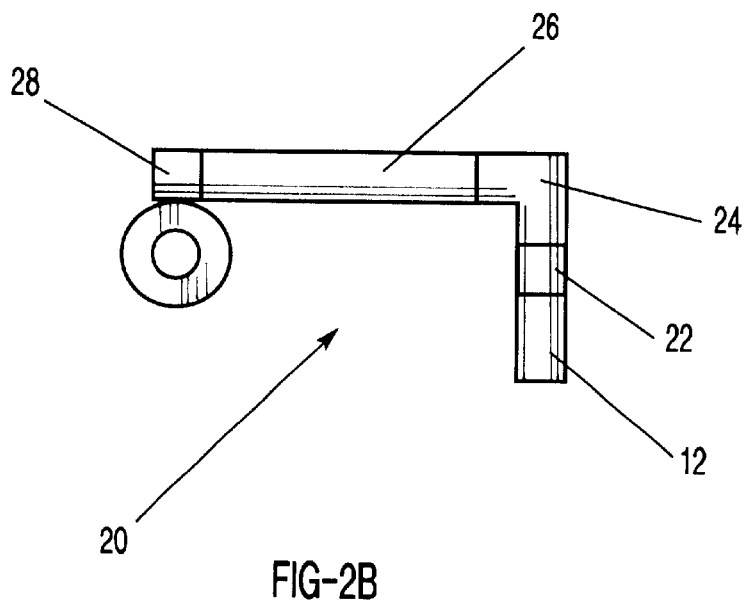
FIG. 2B is a top view of the swivel joint or flex assembly of FIG. 2A.

FIGS. 2A and 2B show a side view and top view of a typical swivel joint or flex assembly 20. The purpose of these assemblies 20 is to detour any impacts to the sprinklers that would damage the system causing breaks in the PVC. The typical composition of the swivel or flex assembly 20 is as follows:

from the lateral line 12 which is normally ¾", one will bush down to ½" line. This is accomplished by bush assembly 22 comprising either a bushing ¾" to ½" or by a male adapter that is already bushed;

after completing the bush assembly 22, attach a ½" 90° elbow 24;

from the elbow 24, either attach a PVC nipple 6" or a piece of flex hose 6" 26;

attach a second 90° elbow 28 that will be positioned on its side followed by a close nipple (not shown) which is approximately 1" to a third 90° elbow 32 which will face up to the surface; and.

attach a riser nipple 34 that will connect to sprinkler 36.

As previously stated swivel joint or flex assemblies are used to allow for movement and avoid breakage. However, the assemblies are buried into the ground and then compacted which constricts any movement. Therefore, when the assembly is further compacted by vehicles running over the ground in which the assembly is buried or when the assembly is struck, the assemblies merely are crushed or broken. The present invention allows for movement for swivel joint or flex assemblies.

Figure 3:
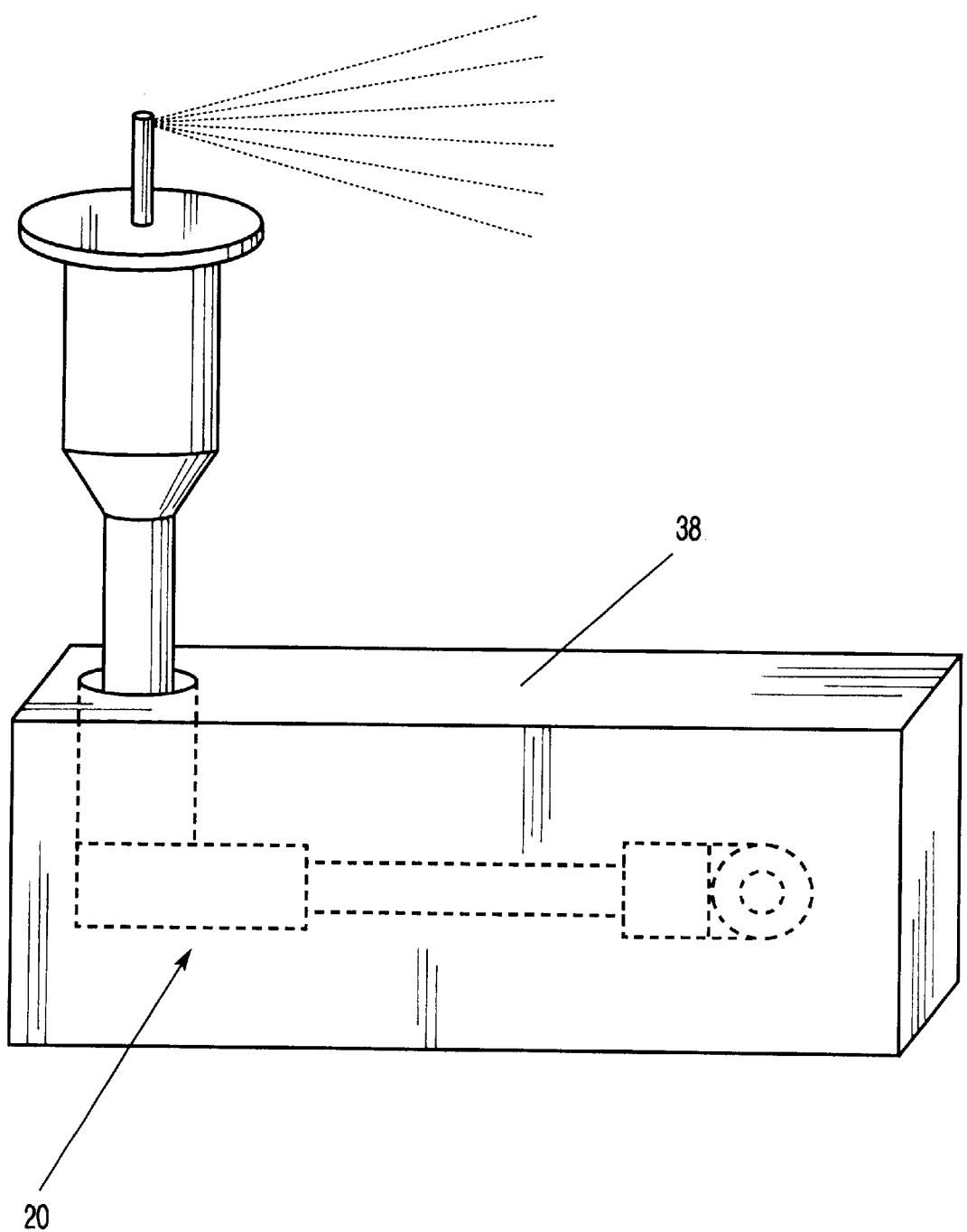
FIG. 3 shows the preferred pipe protector around a swivel joint.

FIG. 3 shows the preferred irrigation pad 38 surrounding a typical swivel joint or flex assembly 20. Irrigation padding 38 is used wherever flex hose or swivel joint assemblies 20 are used or the padding can be used over the PVC pipe itself. It provides movement in an otherwise compact and hard environment under ground. Whenever a sprinkler is struck by either a vehicle or man or other obstacle, irrigation systems tend to break due to the impact. Irrigation pads 38 are preferably polyethylene synthetic blocks formed to fit around the flex hose or swivel joint assemblies 20. The preferred polyethylene material is a foam material, such a styrofoam, with 2½ pound crush weight. Other types of material can be used as long as the material is of sufficient density so it can absorb a compacting force and allow a limited amount of movement to the inserted pipe and will revert or rebound to its original shape and size after the crushing or compacting force is removed. In addition, the padding material should preferably be a material that does not deteriorate in a moist or wet surrounding. The preferred padding material is ethylene vinyl acetate (EVA), due to its durability. Although only rectangular blocks are shown, the irrigation pads can be any other shape such as cylindrical, pentagon or the like. The important factor is the thickness of the irrigation pad between the enclosed assembly and the soil. The thickness of the padding material is dependant on the nature of the forces compacting the soil, the incidence of the compacting forces and the crush rate of the padding material. The higher the compacting forces or the incidence of the compacting forces, the padding material should be thicker or have a higher crush rating. Different type irrigation pads could be manufactured or hand made.

Figure 4:
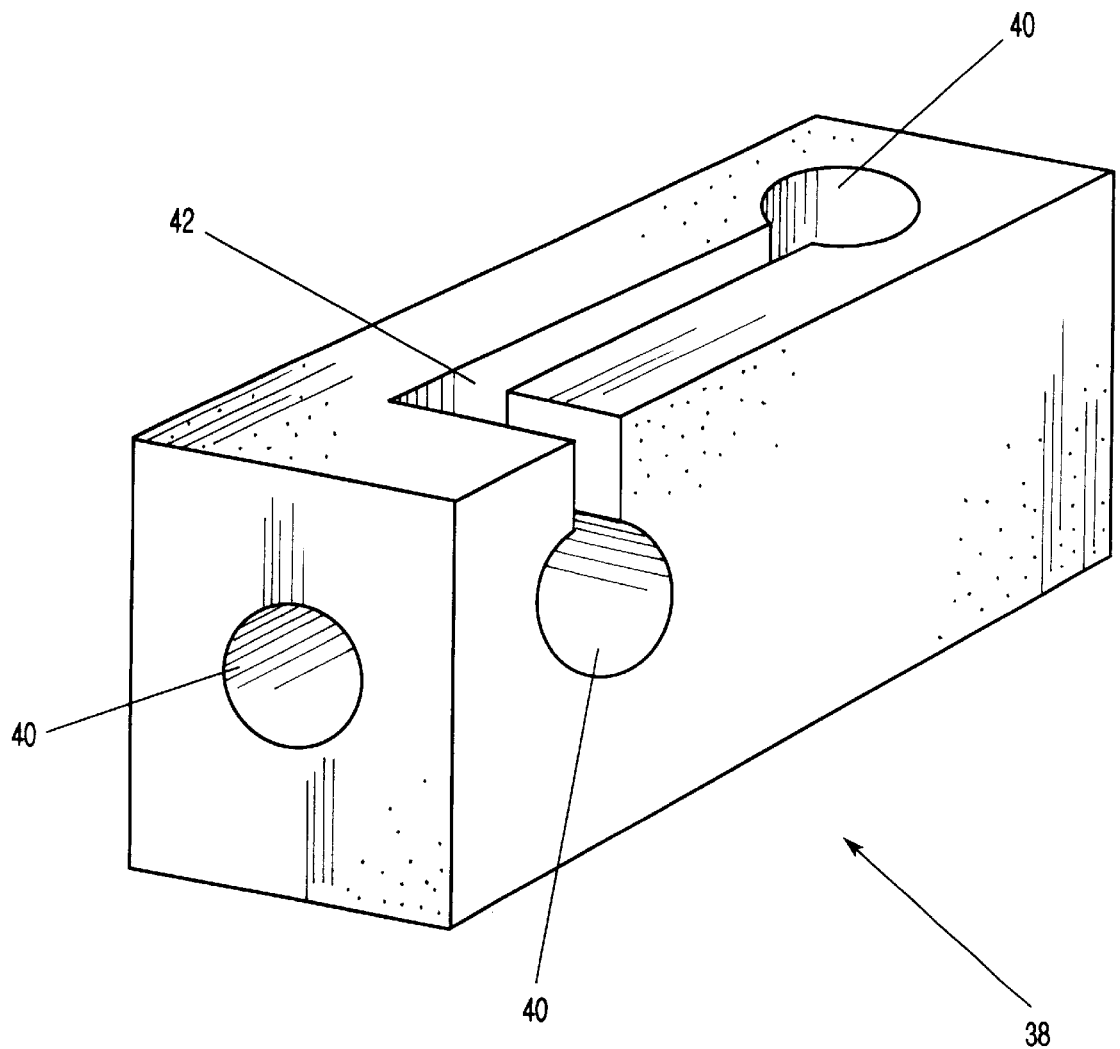
FIG. 4 shows one embodiment of the preferred irrigation pipe protector.

FIG. 4 shows one embodiment of the preferred irrigation pipe protector. Preferably the irrigation pad 38 will have an aperture or hole 40 slightly larger than the pipe or component to be surrounded by the irrigation padding 38. This includes any joints and pipes. For instance, if a 90° elbow is to be enclosed, an aperture 40 with a similar configuration must be contained within the irrigation pad 38. For easy insertion of the component into the irrigation pad 38, the pad can be sliced or cut 42 from the outside of the pad to the aperture. The irrigation pad 38 is then pulled or stretched apart at the sliced or cut area 42 and the component forced or inserted into the corresponding aperture 40. In the alternative, the synthetic polyethylene in an uncured state could be poured into a molding around the components and allowed to cure or the uncured synthetic polyethylene could be placed in a pressurized spray can and sprayed onto the components until the desired thickness is achieved and allowed to cure (not shown). The size of the irrigation pad depends on the size of pipe or component being protected. For instance, a half-inch assembly typically requires a two and half inch width and three inch height in order to achieve one inch drop of protection. Which means when the sprinkler is run over or struck, it can drop one inch before the assembly will break. If more protection is needed, a pad is needed with more height on the block. The present invention also has several safety factors for sports field uses. For instance, if impacted by players or equipment, the present invention will allow the sprinkler to recoil thus allowing less room for possible injury on the athletic fields. The present invention is ideal in areas with heavy traffic such as public parks or sports fields with heavy use. The invention cuts down on damage and time wasted on repairing irrigation systems.

By installing the padding, the surrounding environment is changed from hard and compact to soft and resilient, allowing room for movement when necessary.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A sprinkler system for protecting sprinkler pipes from breaking due to forces exerted onto the sprinkler pipes, the system comprising a padding material disposed around the sprinkler pipes, said padding material comprising a material that reverts to approximately a same size after the force is removed and wherein said padding material comprises a width and height to allow a predetermined amount of maximum movement by the sprinkler pipe when the forces are exerted onto the sprinkler pipe.

2. The invention of claim 1 wherein said padding material comprises a material that allows limited movement of the sprinkler pipe when the forces are exerted onto the sprinkler pipe.

3. The invention of claim 1 wherein said padding material comprises polyethylene.

4. The invention of claim 3 wherein said polyethylene comprises a foam material.

5. The invention of claim 4 wherein the foam material comprises styrofoam.

6. The invention of claim 1 wherein the padding material comprises approximately two and one-half pounds crush weight.

7. The invention of claim 1 wherein the padding material comprises a non-deteriorating material.

8. The invention of claim 1 wherein said padding material comprises ethylene vinyl acetate.

9. A method for protecting buried pipes from breaking due to forces exerted onto the pipes, the method comprising the steps of:

selecting a padding material with a preselected crush weight, wherein the step of selecting comprises selecting a padding material comprising a width and height to allow a predetermined amount of movement by the pipe when the forces are exerted onto the pipe;

disposing a padding material around the pipes, the padding material comprising a material that reverts to approximately a same size after the force is removed; and burying the padded pipes.

10. The method of claim 9 wherein the step of disposing comprises:

making an aperture in the padding material; and inserting the pipe into the aperture.

11. The method of claim 10 further comprising making a slit in the padding material into the aperture and parallel to the aperture.

12. The method of claim 9 wherein the step of disposing comprises molding the padding material around the pipe in an uncured state and curing the padding material.

13. The method of claim 9 wherein the step of disposing comprises spraying the padding material onto the pipe in an uncured state and curing the padding material.

14. The method of claim 9 wherein the step of disposing comprises encasing the pipe with the padding material in a manner that allows limited movement of the pipe when forces are exerted onto the pipe.

15. The method of claim 9 wherein the padding material comprises polyethylene.

16. The method of claim 15 wherein the polyethylene comprises a foam material.

17. The method of claim 16 wherein the foam material comprises styrofoam.

18. The method of claim 9 wherein the step of selecting comprises selecting a padding material comprising a non-deteriorating material.

* * * * *